Patented Dec. 13, 1949

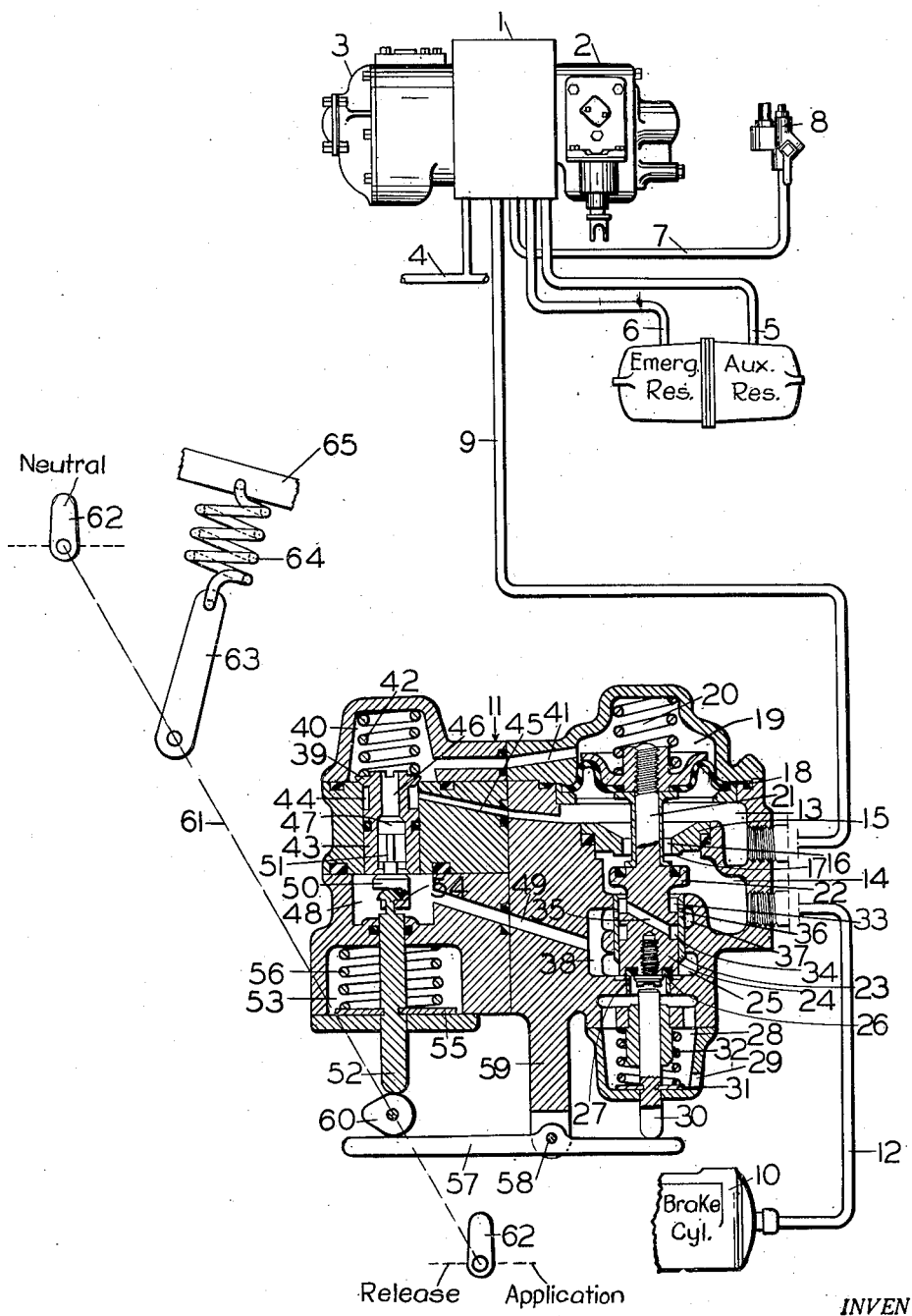

2,490,998

UNITED STATES PATENT OFFICE 2,490,998

CONTROL APPARATUS FOR CONTROLLING BRAKE CYLINDER PRESSURE

Everett P. Sexton, East McKeesport, Pa., assignor to The Westinghouse Air Brake Company, Wilmerding, Pa., a corporation of Pennsylvania Application October 17, 1947, Serial No. 780,364

13 Claims. (Cl. 303—68)

This invention relates to automatic fluid pressure brake equipment, such as the AB type, for use on railway vehicles and more particularly to means for releasing and reapplying the vehicle brakes by fluid under pressure with the brake pipe completely vented.

When a vehicle provided with such equipment and having the reservoir or reservoirs thereof charged with fluid under pressure, is cut out of a train for switching operation, inspection of the brake equipment or the like, the brake pipe is completely vented and the brake controlling valve device will move to emergency position and establish communication between said reservoir or reservoirs and the brake cylinder device, whereupon the pressure of fluid in said reservoirs will equalize into said brake cylinder device and effect an emergency application of brakes on the vehicle.

It has heretofore been proposed to provide a brake cylinder release valve device arranged for operation from the side of the vehicle for venting fluid under pressure from the brake cylinder device to release the brake application thus effected without, however, dissipating and wasting the fluid pressure remaining in the partly charged reservoir or reservoirs, so that when the vehicle is again connected into a train, less fluid under pressure and less time will be required to recharge the brake equipment, and this is very important, particularly when a number of vehicles are involved, in order to expedite movement of the train.

By way of example, such a brake cylinder release valve device is disclosed in U. S. Patent 2,392,185, issued on January 1, 1946, to L. I. Pickert. This release valve device is disposed in the pipe connecting the brake cylinder device to the well-known AB control valve and is operative manually for closing communication through said pipe between the fluid pressure supply reservoirs and the brake cylinder device and for opening the brake cylinder device to atmosphere for releasing the brakes on the vehicle, while at the same time retaining the fluid pressure remaining in the reservoirs. With the brakes on the vehicle thus released the vehicle may be freely switched, but when the vehicle is again connected into a train and the brake pipe is recharged for recharging the reservoirs on the vehicle, the release valve device automatically operates to disconnect the brake cylinder device from atmosphere and reestablish the communication between the brake cylinder device and the AB control valve to insure that the brakes will be effective when subsequently desired.

During switching operation of a vehicle there may, however, be times when it is desirable to apply the vehicle brakes with the brake pipe still vented, and while this can be accomplished by operation of the usual hand brake, it is nevertheless more desirable, where fluid under pressure is still stored in the partly charged reservoir or reservoirs, to employ this fluid for accomplishing this end. On the other hand, during yard inspection of railway vehicles it is necessary to apply the brakes on each individual vehicle by fluid under pressure to check the brake cylinder piston travel and then release the brakes for adjusting, if necessary, such travel to within prescribed limits, and particularly if new brake shoes are required, these operations may have to be repeated to obtain the desired adjustment. To expedite such inspection and adjustment it is therefore desirable, where fluid under pressure is still stored in the partly charged reservoir or reservoirs on the vehicle, to employ such fluid for operating the brake cylinder device to apply the brakes.

It will therefore be seen that it is desirable to associate with a brake cylinder release valve device, such as above described, means controlled manually for applying the brakes by fluid under pressure remaining in the reservoir or reservoirs on the vehicle, and one object of the invention is therefore the provision of means for accomplishing this end.

Before descending certain long dangerous grades, it is customary to vent the brake pipe to effect an emergency application of brakes for the purpose of inspecting the brake equipment to make sure it is operating properly, and to also replace extensively worn brake shoes, if necessary. While this inspection is taking place the usual brake cylinder pressure retaining valve devices on the vehicles will be turned up for preventing the brake cylinder pressure reducing below a certain degree, such as 10 pounds, during cycling operation on the descent of the grade.

If the vehicles are equipped with brake cylinder release valve devices such as above described, these devices will be employed for releasing the brakes on individual vehicles to permit inspection, replacement of brake shoes, etc. In order to insure that the brakes on the vehicles will later apply when called upon to do so during the descent, it is therefore necessary upon recharging the brake pipe, prior to starting the descent, to insure that any of these brake release valve devices which have been operated to their brake cylinder release position, positively and automatically return to their normal position in response to such recharge, even if the brake cylinder pressure retaining valve device on a vehicle has in the meantime been turned up to prevent a complete release of fluid under pressure from the portion of the brake cylinder pipe connecting the brake controlling valve device on the vehicle to the respective brake release valve device, and another object of the invention is the provision of means for accomplishing this end.

Still another object of the invention is the provision of a brake application and release valve device for a vehicle arranged to be operated manually, either while riding the vehicle or from the ground, for, with the brake pipe vented, releasing the brakes on the vehicle without dissipating and thereby wasting the fluid pressure remaining in the reservoir or reservoirs thereon, and for reapplying the brakes by such fluid under pressure, and for insuring, in case the release valve device is in its brake cylinder release position, automatic operation thereof to the position for connecting the brake controlling valve device to the brake cylinder device upon recharging of the brake pipe, even with the usual brake cylinder pressure retaining valve device turned up for holding pressure in the brake cylinder device.

Other objects and advantages will become apparent from the following more detailed description of the invention.

In the accompanying drawing, the single figure is a diagrammatic view, partly in outline and partly in section, of a fluid pressure brake equipment embodying the invention.

Description

As shown in the drawing, 1 designates the pipe bracket of an AB control valve, the service portion is designated by 2 and the emergency portion by 3. 4 designates a brake pipe connected to the AB control valve and 5 and 6 designate pipes connecting, respectively, the auxiliary and emergency reservoirs to the AB control valve. 7 designates the brake cylinder release pipe connecting the AB control valve to a brake cylinder pressure retaining valve device 8 of usual structure. 9 designates the usual application and release or brake cylinder pipe connected to the AB control valve and adapted to be connected with the brake cylinder device 10.

All of the parts so far described are of known construction, the AB control valve being standard on American railroads.

The reference numeral 11 indicates a brake cylinder fluid pressure release and supply valve device embodying the subject matter of the present invention, said device being interposed between the brake cylinder pipe 9 and a pipe 12 connected to the brake cylinder device 10.

The brake cylinder release and supply valve device 11 comprises a casing having two chambers 13 and 14 connected, respectively, to pipes 9 and 12. The chambers 13 and 14 are separated by a partition wall 15 having a central aperture 16 and an annular valve seat 17 surrounding said aperture and extending into chamber 14. The chamber 13 is formed at one side of a flexible diaphragm 18 while at the opposite side is a chamber 19 containing a spring 20 acting on said diaphragm urging it in the direction of chamber 13. The diaphragm 18 is arranged in coaxial relation to the aperture 16 in partition 15 and a stem 21 connected at one end to said diaphragm and extending through said aperture is connected in chamber 14 to a valve structure comprising a poppet valve 22 arranged to cooperate with the annular seat 17 for closing communication between chambers 13 and 14. Depending from the valve 22 and having sliding engagement within a bushing 23 secured in the casing is an integral slide valve 24 extending into a chamber 25 and provided therein on its lower end with a valve 26 arranged to cooperate with an annular casing seat 27 for controlling communication between chamber 25 and a chamber 28 which is open to atmosphere through a port 29. A pin 30 slidably mounted in a suitable bore in the casing in coaxial relation with slide valve 24 has one end arranged for engaging the lower end of said valve while the other end projects to the outside of the casing. In chamber 28 a washer 31 secured to pin 30 is acted upon by one end of a spring 32 the opposite end of which is supported by the casing, for normally holding said pin in the position in which it is shown in the drawing in which its one end is just out of contact with valve 26.

The slide valve 24, which is annular in form, is provided with two spaced apart annular grooves 33 and 34 connected together by a diagonal passage 35, the groove 33 being constantly open to chamber 14. With the valve 26 seated and valve 22 open the groove 33 is open through one or more small ports 36 in bushing 23 to an annular cavity 37 encircling said bushing. The cavity 37 is open through a passage 38 to chamber 25. With the valve 22 in contact with seat 17, the valve 26 will be unseated, and in this position of the slide valve 24 the ports 36 will be open to cavity 34 in said slide valve. As the slide valve 24 moves from its normal position in which it is shown in the drawing to a brake release position defined by contact with seat 17 the annular groove 33 will be disconnected from the bushing ports 36 before said ports are opened to the groove 34.

The structure thus far described may be substantially the same as structure disclosed in the Pickert patent hereinbefore referred to, with the exception of spring 20 acting on diaphragm 18. The pressure of this spring is sufficient to open the valve 22 and close the valve 26 against fluid in chamber 13 at the pressure retained by the retaining valve device 8, as will hereinafter be more fully described.

According to the invention I also provide valve means for selectively connecting the diaphragm chamber 19 to either chamber 13 or chamber 25, said means comprising a valve 39 contained in a chamber 40 which is open through a passage 41 to chamber 19. A spring 42 in chamber 40 acts on valve 39 for urging it to its seat formed on the casing. The valve 39 is formed on one end of a plunger 43 slidably mounted in the casing and provided adjacent said valve with an annular groove 44. The groove 44 is open to a passage 45 which is connected to chamber 13. The valve 39 is provided with an axial bore 46 open at one end to chamber 40 and extending into the plunger 43 where its opposite end is open to a coaxial bore 47 of larger diameter which opens through the opposite end of the plunger to a chamber 48. Chamber 48 is connected by a passage 49 to passage 38 and thus chamber 25. A valve 50 contained in chamber 48 has a fluted stem 51 slidably mounted in the bore 47 and is arranged to cooperate with a seat provided on the adjacent end of plunger 43 for controlling communication between chamber 40 and chamber 48. Also extending into chamber 48 opposite the valve 50 is one end of a pin 52 slidably mounted in suitable bores in the casing, and extending through a chamber 53 formed between said bores, to the exterior of the casing. The valve 50 has a projecting hook 54 disposed in a recess in the adjacent end of pin 52 whereby said pin is rendered effective to pull said valve from its seat. In chamber 53 a washer 55 secured to pin 52 is subject to the pressure of a spring 56 for actuating said pin to pull the valve 50 out of contact with its seat, said washer being adapted to engage the casing as shown on the drawing for defining such unseated position.

The ends of pins 30 and 52 disposed outside of the casing are arranged in spaced, parallel relation to each other and in alignment with opposite ends of a lever 57 which is fulcrumed on a pin 58 arranged closer to the pin 30 than to the pin 52. The fulcrum pin 58 is carried by a lug 59 depending from the casing of the valve device. Interposed between the end of pin 52 and the adjacent end of lever 57 is a cam 60 which is secured to a shaft 61 adapted to extend to opposite sides of the vehicle. On each end of the shaft 61 is a handle 62 for operating said shaft to turn cam 60. The handles 62 are provided for operation by a trainman and will be preferably disposed so that the trainman may operate them either while riding the vehicle or from the ground.

The handles 67, shaft 61 and cam 60 have three positions, namely, a neutral position in which they are shown on the drawing, and release and application positions, respectively, at opposite sides of said neutral position, as indicated in the drawing by appropriate legends.

Also secured to the shaft 61 at any suitable point is one end of a centering lever 63. The other end of lever 63 is connected to one end of a centering spring 64 the other end of which is anchored on any suitably fixed part 65 of the vehicle. The spring 64 is tensioned between the part 65 and lever 63 for urging said lever, the shaft 61, handles 62 and thereby the cam 60 to their neutral position.

*Operation*

In operation, assuming that the AB control valve is in its usual release position and the handles 62 are in their normal or neutral position in which they are shown in the drawing, the brake cylinder pipe 9 will be open to atmosphere, assuming that the retaining valve device 8 is in its usual non-retaining position, and the parts of the release and application valve device 11 will occupy the position in which they are shown in the drawing, due to the action of spring 20 on the stem 21 which will open the valve 22 and close the valve 26, and since spring 56 will unseat the valve 50 and permit closing of the valve 39 by spring 42. With the parts thus conditioned diaphragm chamber 19 will be open through passage 41, valve chamber 40, axial bores 46 and 47 in plunger 43, past the valve 50 to chamber 48 and thence through passage 49 to chamber 25.

Now assume that the brake equipment is fully charged with fluid under pressure and that an emergency reduction and complete venting of fluid under pressure from the brake pipe is effected, due to which the emergency and auxiliary reservoirs will be opened to the brake cylinder pipe 9 and the pressure of fluid in said reservoirs will therefore equalize through said brake cylinder pipe, chamber 12, past the unseated valve 22 into chamber 14 and thence through pipe 12 into the brake cylinder device 10 for applying the brakes.

As fluid under pressure is thus supplied to chambers 13 and 14 for actuating the brake cylinder device 10, fluid from chamber 14 will also flow through the annular groove 33 in the slide valve 24 and ports 36 into the annular cavity 37 and thence through passages 38 and 49 to chamber 48. Fluid under pressure thus supplied to chamber 48 will then flow past the unseated valve 50 and through the axial bores 47 and 46 into chamber 40 and then through passage 41 to diaphragm chamber 19, whereby the pressure of fluid in chamber 19 will increase at such a rate with respect to the rate of increase in pressure in chamber 13 as to enable spring 20 to prevent movement of diaphragm 18 and thus hold the valve 22 open and the valve 26 closed, the pressure of fluid eventually equalizing in chambers 13 and 19 at opposite sides of the diaphragm 18, as will be apparent.

In order to now release the brakes on the vehicle without dissipating the fluid pressure still remaining in the emergency and auxiliary reservoirs, the operator will actuate one of the handles 62 to its release position for thereby actuating the shaft 61 and cam 60 to rock the lever 57 in a counterclockwise direction about pin 58. This operation of lever 57 will shift pin 30 against spring 32 to move the valve 26 and slide valve 24 in the direction away from the valve seat 27 against the pressure of spring 20 acting on diaphragm 18.

As the valve 26 is thus unseated, the slide valve 24 will operate to first throttle and then close the fluid supply communication to diaphragm chamber 19 through the ports 36, whereby the opening of valve 26 will be able to effect a rapid reduction in pressure of fluid in diaphragm chamber 19 to permit pressure of fluid in chamber 13 to promptly move the diaphragm 18 against spring 20 for seating the valve 22 and opening wide the valve 26. Communication is thereby closed between chambers 13 and 14, and thus between the auxiliary and emergency reservoirs and the brake cylinder device 10, while the diaphragm chamber 19 is held open to atmosphere.

When the valve 22 is seated as just mentioned the annular groove 34 in the slide valve 24 will move into registry with the ports 36 for establishing communication from chamber 14, through the annular groove 33 and passage 35 in slide valve 24, to the annular groove 34 which now is in registry with the ports 36, whereby fluid under pressure from the brake cylinder device 10 will flow through the communication just described to passage 38 and thence past the open valve 26 to chamber 28 and atmosphere through the passage 29, the flow capacity of said communication being such as to prevent any material increase in pressure in diaphragm chamber 19 by flow from passage 38.

It will thus be seen that upon depression of pin 30 to unseat the valve 26 and seat the valve 22 fluid under pressure will be released from the brake cylinder device 9 for releasing the brakes on the vehicle while the fluid under pressure remaining in the auxiliary and emergency reservoirs following the emergency application will be retained therein.

When either handle 62 is moved to its release position for effecting a release of fluid under pressure from the brake cylinder device 10 as just described, it need only be held in said position momentarily to permit pressure of fluid in diaphragm chamber 19 to reduce to a degree to permit pressure of fluid in chamber 13 to actuate the diaphragm 19 to its upper position, whereupon said handle may be released. Upon release of the handle 62 the tension spring 64 acting through lever 63 on the rod 61 will automatically return said handle and cam to neutral position and permit the return of pin 30 to its normal position, as shown in the drawing, but the valve 22 will remain seated and the valve 26 unseated by pressure of fluid in chamber 13 acting on diaphragm 18.

If the trainman now desires to reapply the brakes, by supplying fluid under pressure remaining in the auxiliary and emergency reservoirs to the brake cylinder device 10, he will operate either handle 62 to its application position and thereby actuate cam 60 to move pin 52 against spring 56 for thereby seating valve 50 on the end of plunger 43 and for then actuating said plunger to unseat the valve 39. When valve 39 is thus unseated, fluid under pressure from the auxiliary and emergency reservoirs present in the chamber 13 will flow therefrom through passage 45, past said valve to chamber 40 and then through passage 41 to diaphragm chambr 19, thereby equalizing the pressures of fluid acting on opposite sides of said diaphragm whereupon spring 20 will actuate stem 21 to unseat valve 22 and to reseat valve 26. Fluid under pressure in the auxiliary and emergency reservoirs will now flow past the valve 22 to the brake cylinder device 10 and actuate same to reapply the brakes. Following this operation the trainman may release the operating handle 62 to permit spring 63 to return said handle, the operating shaft 61 and cam 60 to their neutral position, whereupon spring 56 will actuate pin 52 to permit movement of valve 39 by spring 42 into contact with its seat, followed by movement of valve 50 out of seating engagement with the plunger 43. With the valve 50 thus unseated, communication is again established between diaphragm chamber 19 and the release valve chamber 25 and thereby with chambers 14 and 13 through the ports 36 in the bushing 23 and the annular groove 33 in the slide valve 24. Therefore, after seating of valve 39 the fluid pressures will remain equalized on opposite sides of the diaphragm 18, so that spring 20 can maintain the valve 22 open and the valve 26 closed.

If the operator desires to release the brake application effected in the manner just described he need only momentarily move one or the other handles 62 to its release position, in response to which the supply and release valve device 11 will again operate in the same manner as above described to seat valve 22 and open valve 26 for connecting the brake cylinder device 10 to atmosphere for releasing the brakes. Following such release of brakes, if the trainman desires to reapply the brakes by fluid under pressure he need only move one of the operating handles 62 to its application position, whereupon fluid under pressure from the emergency and auxiliary reservoirs will be supplied to the brake cylinder device 10 for applying the brakes.

With the brake pipe completely vented, the operator may, in the manner just described, cause the brakes on the vehicle to be successively applied and released a number of times or until the pressure of fluid in the auxiliary and emergency reservoirs is substantially dissipated.

When the brake pipe 4 is recharged with fluid under pressure, upon connecting the vehicle into a train, the AB control valve will operate in the usual manner to open the brake cylinder pipe 9 to the release pipe 7 leading to the retaining valve device 8 for thereby releasing fluid under pressure from pipe 9 and the connected chamber 13 in the brake cylinder supply and release valve device 11. If at this time the parts of the brake cylinder supply and release valve device 11 are in their normal position shown in the drawing, in which the brake cylinder device 10 is open to pipe 9, fluid under pressure will be released from said brake cylinder device in the conventional manner for releasing the brakes on the vehicle. If, however, the parts of the brake cylinder supply and release valve device 11 are in their release position in which the valve 22 is seated and the valve 26 is unseated, then when the pressure of fluid in chamber 13 is sufficiently reduced by flow through pipe 9, the spring 20 will deflect the diaphragm 18 and thereby actuate stem 21 to open valve 22 and close valve 26, the slide valve 24 now reestablishing communication between chamber 14 and diaphragm chamber 19. The application and release valve device 11 is now conditioned to render the brake cylinder device 10 controllable by the AB control valve in the usual manner, and will remain so conditioned until again operated manually to release fluid under pressure from said brake cylinder device as above described.

When the brake pipe 4 is recharged with fluid under pressure to cause operation of the AB control valve to connect the brake cylinder pipe 9 to the release pipe 7 leading to the retaining valve device 8, if said retaining valve device is conditioned to hold a chosen pressure of fluid in the brake cylinder device, the pressure of fluid in pipe 9 will then only reduce to this chosen degree. The pressure of fluid in chamber 13 in the brake cylinder supply and release valve device 11 will also only reduce to a like degree, but the pressure of spring 20, provided according to the invention, is such as to deflect diaphragm 18 against this retained pressure of fluid in chamber 13 for opening valve 22 and closing valve 26, thus insuring that the brake cylinder device 10 will be automatically opened to the AB brake control valve under such a condition.

To ensure this operation of the brake cylinder supply and release valve device 11, when the pressure retaining valve device 8 is conditioned to retain pressure of fluid in the brake cylinder device 10, requires that spring 20 exert a relatively high force on diaphragm 18, which force would prevent movement of said diaphragm against said spring with manual pressure applied directly to the pin 30. To attain the necessary force for moving the diaphragm 18 against spring 20 under this condition the arm of lever 57 for operating the pin 30 is shorter than the arm of lever 57 which is operated by the manually operative cam 60.

Summary

From the above description it will now be seen that after a vehicle has been set out of a train with the brakes applied in emergency and the brake pipe vented, a trainman may by operation of either handle 62 release the brakes on the vehicle and retain the fluid pressure remaining in the auxiliary and emergency reservoirs at that time. If desired, he may then reapply the brakes by fluid under pressure from the auxiliary and emergency reservoirs, and subsequently release the brakes, and continue such application and release of brakes as long as adequate fluid pressure remains in said reservoirs for actuating the brake cylinder device 10. The brake cylinder supply and release valve device 11 controlling the application and release communication between the brake cylinder pipe and the brake cylinder device is arranged to operate automatically, in case said communication is closed upon recharging of the brake pipe, even with the usual brake cylinder pressure retaining valve device adjusted to hold pressure in the brake cylinder device, to reestablish said communication to insure an application of brakes on the vehicle by operation of the AB control valve upon a subsequent reduction in brake pipe pressure, and thereby insure the safety of the vehicle.

Having now described my invention, what I claim as new and desire to secure by Letters Patent is:

1. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake release and application valve device comprising valve means having a normal position for establishing communication between said application and release pipe and said second pipe and having a brake release position for closing said communication and for opening said second pipe to atmosphere, means responsive to fluid under pressure to return said valve means to said normal position, an operator's control handle, and means operable by said handle to selectively move said valve means to said brake release position or to supply fluid under pressure to said fluid pressure responsive means.

2. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake release and application valve device comprising valve means having a normal position for establishing communication between said application and release pipe and said second pipe and having a brake release position for closing said communication and for opening said second pipe to atmosphere, an operating element for moving said valve means to said brake release position, means including another operating element for effecting movement of said valve means to said normal position, and manually operable means for selectively operating the two operating elements.

3. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake release and application valve device comprising valve means having a normal position for establishing communication between said application and release pipe and said second pipe and having a brake release position for closing said communication and for opening said second pipe to atmosphere, an operating element for moving said valve means to said brake release position, means including another operating element for effecting movement of said valve means to said normal position, a cam operable upon rotation in one direction for operating the first named operating element, a lever operable by said cam upon rotation in the opposite direction to operate the second named operating element, and a manually operative handle for rotating said cam.

4. A manually operated brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake release and application valve device comprising valve means having a normal position for establishing communication between said application and release pipe and said second pipe and having a brake release position for closing said communication and for opening said second pipe to atmosphere, an element operable upon movement from a normal position to move said valve means to said brake release position, means including another element operable upon movement from a normal position to effect movement of said valve means to its normal position, manual operating means, means operable by said manual means upon movement in one direction from a neutral position thereof to effect movement of one of said elements from its normal position and operative upon movement in the opposite direction from neutral position to effect movement of the other element from its normal position, and means for urging said elements to their normal position in said neutral position of said manual operating means and when not operable by said manual operating means.

5. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, manually operative means for moving said valve means to said brake release position, and manually operative valve means for selectively opening said chamber to said application and release pipe or to a passage connected to the first named valve means, said first named valve means in said normal position said passage to said application and release pipe and in said brake release position opening said passage to atmosphere.

6. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, manually operative means for moving said valve means to said brake release position, and manually operative valve means for selectively supplying fluid under pressure to said chamber and for establishing a fluid pressure release communication from said chamber.

7. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, other valve means for selectively opening said chamber to said application and release pipe or to a passage, the first named valve means in said normal position opening said passage to said application and release pipe and in said brake release position opening said passage to atmosphere, and manually operative means for selectively moving the first named valve means to said brake release position or for actuating said other valve means to open said chamber to said application and release pipe, and means for actuating said other valve means to open said chamber to said passage when said first named valve means is operative to its brake release position.

8. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, an operating element, other valve means operative by said element to open said chamber to said application and release pipe and operable upon release of actuating force on said element to open said chamber to a passage, the first named valve means in its brake release position opening said passage to atmosphere and in its normal position opening said passage to said application and release pipe, another operating element for moving said first named valve means to said brake release position against pressure of said spring means, actuating means for selectively operating said elements, and a manually operable handle for actuating said actuating means.

9. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, an operating element, other valve means operative by said element to open said chamber to said application and release pipe and operable upon release of actuating force on said element to open said chamber to a passage, the first named valve means in its brake release position opening said passage to atmosphere and in its normal position opening said passage to said application and release pipe, another operating element for moving said first named valve means to said brake release position against pressure of said spring means, actuating means for selectively operating said elements, said actuating means including lever means for amplifying force from said actuating means for operating said other operating element, and a manually operable handle for actuating said actuating means.

10. A manually operative brake release and application valve device for use with a vehicle fluid pressure brake equipment of the type comprising a brake pipe, at least one normally charged fluid pressure storage reservoir, a brake application and release pipe, a second pipe to which fluid under pressure is adapted to be supplied from said application and release pipe to effect an application of brakes on the vehicle, and a brake controlling valve device operative upon venting of fluid under pressure from said brake pipe to establish communication between said reservoir and said application and release pipe, said brake application and release valve device comprising valve means having a brake release position for closing communication from said application and release pipe to said second pipe and for opening said second pipe to atmosphere, and also having a normal position for disconnecting said second pipe from atmosphere and for opening same to said application and release pipe, movable abutment means connected to said valve device subject to pressure of fluid in said application and release pipe and opposing pressure of fluid in a chamber, spring means acting on said valve means for moving same to said normal position upon substantial equalization of pressures in said chamber and application and release pipe, an operating element movable from a normal position to move said valve means to said brake release position, other valve means having a normal position for opening said chamber to a passage and a second position for opening said chamber to said application and release pipe, a second operating element for moving said other valve means to its second position, a cam operable upon rotation in one direction from a neutral position to move said second element from its normal position, means operable by rotation of said cam in the opposite direction from neutral position to move the first named operating element from its normal position, and means for urging said elements and both valve means to their normal position and for urging said cam to its neutral position.

11. The combination with a fluid pressure controlled device and means for supplying fluid under pressure to and for releasing fluid under pressure from said device, of valve structure controlling communication between said device and said means comprising valve means having a normal position for opening said communication and a second position for closing said communication and for releasing fluid under pressure from said device, actuating means for effecting movement of said valve means to said second position, fluid pressure responsive means for effecting movement of said valve means to said normal position, and a manually operative member for selectively operating said actuating means and for supplying fluid under pressure to said fluid pressure responsive means.

12. In a fluid pressure brake equipment, the combination with a brake cylinder device, a brake controlling valve device for supplying fluid under pressure to and releasing fluid under pressure from said brake cylinder device, and a retaining valve device for retaining a chosen pressure of fluid in said brake cylinder device in releasing fluid under pressure therefrom, of a valve structure disposed in the connection between said brake controlling valve device and said brake cylinder device comprising valve means having a normal position for closing communication from said brake cylinder device and a chamber to atmosphere and for opening a communication from said brake controlling valve device to said brake cylinder device and chamber, and having a brake release position for opening the first defined communication and for closing the second defined communication, movable abutment means connected to said valve means and subject opposingly to pressure of fluid supplied by said brake controlling valve device and pressure of fluid in said chamber and operative by the pressure of fluid from said brake controlling valve device upon release of fluid under pressure from said chamber to hold said valve means in said release position, manually operative means for effecting movement of said valve means to said release position, and spring means acting on said valve means for moving same to said normal position upon reduction in pressure of fluid in the connection between said valve structure and brake controlling valve device to said chosen pressure.

13. In a fluid pressure brake equipment, the combination with a brake cylinder device, a brake controlling valve device for supplying fluid under pressure to and releasing fluid under pressure from said brake cylinder device, and a retaining valve device for retaining a chosen pressure of fluid in said brake cylinder device in releasing fluid under pressure therefrom, of a valve structure disposed in the connection between said brake controlling valve device and brake cylinder device comprising valve means having a normal position for closing communication from said brake cylinder device and a chamber to atmosphere and for opening a communication from said brake controlling valve device to said brake cylinder device and chamber, and having a brake release position for opening the first defined communication and for closing the second defined communication, movable abutment means connected to said valve means and subject opposingly to pressure of fluid supplied by said brake controlling valve device and pressure of fluid in said chamber and operative by the pressure of fluid from said brake controlling valve device upon release of fluid under pressure from said chamber to hold said valve means in said release position, manually operative means for effecting movement of said valve means to said release position, spring means acting on said valve means for moving same to said normal position upon reduction in pressure of fluid in the connection between said valve structure and brake controlling valve device to said chosen pressure, and manually operative means for supplying fluid under pressure to said chamber to also render said spring means effective to move said valve means to said normal position.

EVERETT P. SEXTON.

REFERENCES CITED

The following references are of record in the file of this patent:

UNITED STATES PATENTS

| Number | Name | Date |
|---|---|---|
| 2,287,775 | Baker et al. | June 30, 1942 |
| 2,392,185 | Pickert | Jan. 1, 1946 |